(12) United States Patent
Milburn

(10) Patent No.: US 8,612,088 B2
(45) Date of Patent: Dec. 17, 2013

(54) TIRE PRESSURE MONITORING SYSTEMS AND METHODS

(75) Inventor: Kenneth Milburn, Wolverine Lake, MI (US)

(73) Assignee: Robert Bosch GmbH, Stuttgart (DE)

( * ) Notice: Subject to any disclaimer, the term of this patent is extended or adjusted under 35 U.S.C. 154(b) by 256 days.

(21) Appl. No.: 13/086,714

(22) Filed: Apr. 14, 2011

(65) Prior Publication Data

US 2012/0265395 A1    Oct. 18, 2012

(51) Int. Cl.
| | | |
|---|---|---|
| *G01M 17/00* | (2006.01) | |
| *B60T 8/34* | (2006.01) | |
| *B60T 8/72* | (2006.01) | |
| *B60Q 1/00* | (2006.01) | |
| *G01P 3/56* | (2006.01) | |
| *H01H 47/32* | (2006.01) | |

(52) U.S. Cl.
USPC ............. 701/29.2; 701/34.4; 701/70; 701/74; 701/93; 701/96; 303/113.1; 303/121; 303/159; 303/168; 303/169; 340/425.5; 188/180; 188/181 A; 188/181 C; 324/161; 361/242

(58) Field of Classification Search
USPC ........................ 701/29.2, 34.4, 70, 74, 93, 96; 303/113.1, 121, 159, 168, 169, 177, 303/179, 182, 186; 188/180, 181 A, 181 C, 188/181 R, 197; 180/170, 178, 179, 197; 340/425.5, 438–444; 123/350–352; 324/161; 361/242
See application file for complete search history.

(56) References Cited

U.S. PATENT DOCUMENTS

| | | | |
|---|---|---|---|
| 4,355,298 A | | 10/1982 | Jessup |
| 5,569,848 A | | 10/1996 | Sharp |
| 5,721,374 A | * | 2/1998 | Siekkinen et al. ........... 73/146.2 |
| 6,218,935 B1 | | 4/2001 | Corcoran et al. |
| 6,445,337 B1 | | 9/2002 | Reiche |
| 6,688,168 B1 | | 2/2004 | Elliott et al. |
| 7,151,479 B2 | * | 12/2006 | Beez et al. ...................... 342/70 |

(Continued)

FOREIGN PATENT DOCUMENTS

| | | |
|---|---|---|
| DE | 102007029412 | 1/2009 |
| FR | 2271063 | 12/1975 |
| GB | 2246461 | 1/1992 |

OTHER PUBLICATIONS

Search Report from the European Patent Office for Application No. 12164211.0 dated Jul. 27, 2012 (7 pages).

*Primary Examiner* — James Trammell
*Assistant Examiner* — Majdi Alsomiri
(74) *Attorney, Agent, or Firm* — Michael Best & Friedrich LLP

(57) ABSTRACT

A system for determining if a tire of a vehicle is improperly inflated. The system includes a radar, a wheel speed sensor, and a controller. The radar is configured to emit a signal to detect a reflection of the signal off of an object positioned perpendicular to the vehicle, and to output an indication of a speed of the vehicle. The wheel speed sensor is configured to sense a speed of a wheel of the vehicle. The controller is configured to receive the indication of the speed of the vehicle from the radar, to calculate a speed of the vehicle based on the sensed speed of the wheel, and to determine a tire of the wheel is improperly inflated when the speed of the vehicle calculated using the wheel speed sensor varies by more than a predetermined amount from the speed of the vehicle determined using the radar signal.

19 Claims, 3 Drawing Sheets

(56) References Cited

U.S. PATENT DOCUMENTS 7,283,904 B2  10/2007  Benjamin et al.
7,295,103 B2  11/2007  Muller et al.
2010/0179718 A1  7/2010  Kobe et al.

\* cited by examiner

TIRE PRESSURE MONITORING SYSTEMS AND METHODS

BACKGROUND

The invention relates to determining whether a tire is improperly inflated. Specifically, the invention relates to using radar to determine a speed of a vehicle and a wheel speed sensor to determine a speed of a wheel, and determining, based on the determined speed of the vehicle and the determined speed of the wheel whether a tire on the wheel is over-inflated, under-inflated, or properly-inflated.

Vehicles today determine the inflation status of their tires to provide an indication to a driver whether the tires are properly inflated or not. Generally, the tire pressure is determined by a pressure sensor inside the tire which wirelessly communicates the pressure to a transmitter which forwards the data on to a controller.

Vehicles today also include various other sensors for operating the vehicle. For example, wheel speed sensors are used by electronic stability control systems and anti-lock braking systems, and radar is employed by automatic cruise control and collision avoidance systems.

SUMMARY

The invention uses sensors necessary for functions other than tire pressure to determine if the tire pressure is acceptable, allowing a reduction in cost by eliminating the need for a pressure sensor and transmitter for each wheel.

In one embodiment, the invention provides a system for determining if a tire of a vehicle is improperly inflated. The system includes a radar, a wheel speed sensor, and a controller. The radar is configured to emit a signal generally parallel to a surface the vehicle is traveling on, to detect a reflection of the signal off of an object positioned perpendicular to the vehicle, and to output an indication of a speed of the vehicle. The wheel speed sensor is configured to sense a speed of a wheel of the vehicle. The controller is coupled to the radar and the wheel speed sensor, and is configured to receive the indication of the speed of the vehicle from the radar, to calculate a speed of the vehicle based on the sensed speed of the wheel, and to determine a tire of the wheel is improperly inflated when the speed of the vehicle calculated using the wheel speed sensor varies by more than a predetermined amount from the speed of the vehicle determined using the radar signal.

In another embodiment the invention provides a method of detecting an improperly inflated tire on a vehicle. The method includes emitting a signal in a forward direction generally parallel to a surface the vehicle is traveling on, detecting a reflection of the signal off of an object positioned perpendicular to the vehicle, determining a speed of the vehicle based on the signal, detecting a speed of a wheel of the vehicle, determining a calculated speed of the vehicle based on the detected speed of the wheel, and determining a tire of the wheel is improperly inflated when the calculated speed of the vehicle varies by more than a predetermined amount from the speed of the vehicle determined based on the signal.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
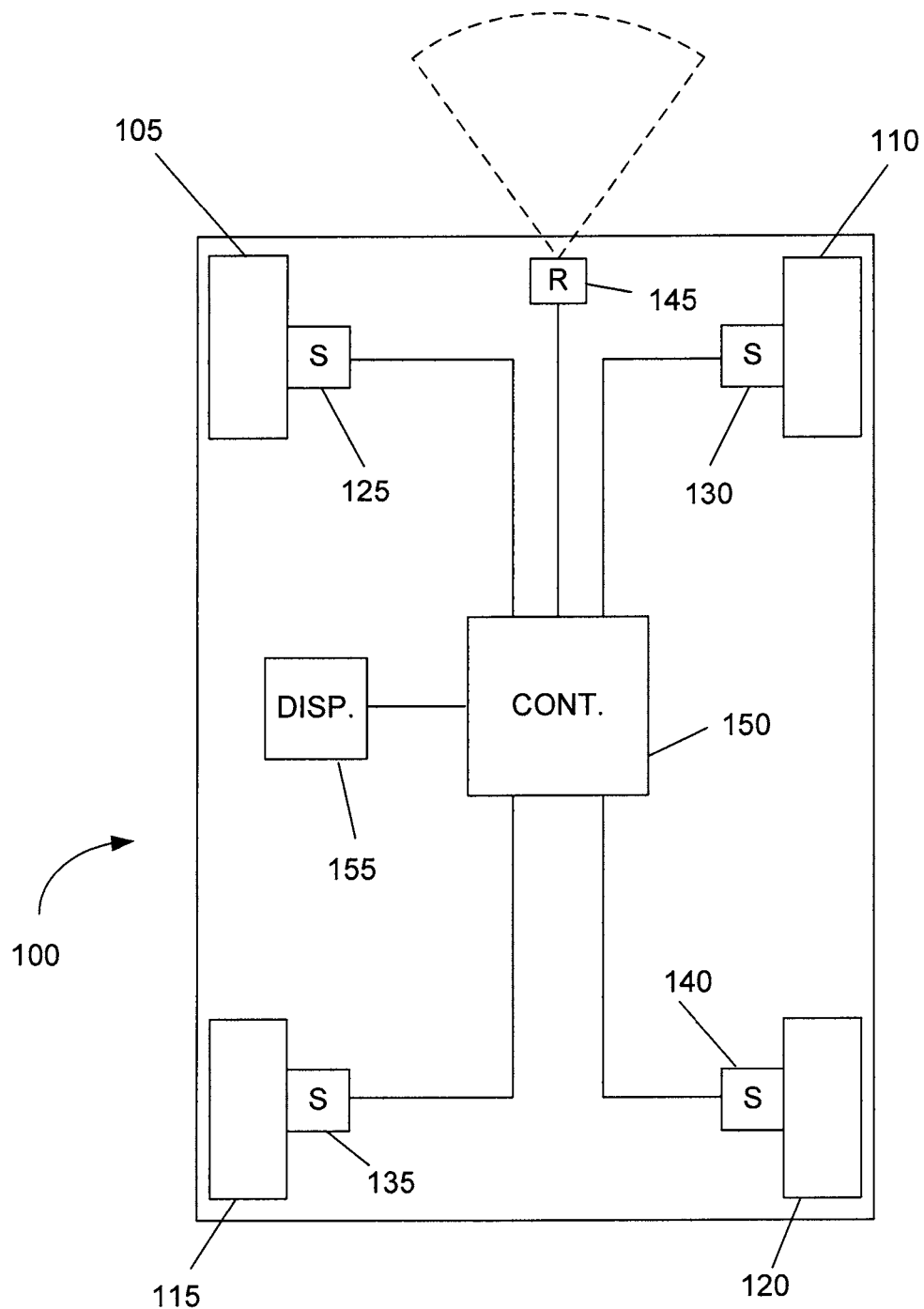
FIG. 1 is a block diagram of a vehicle incorporating the invention.

FIG. 1 shows a block diagram of a vehicle 100. The vehicle includes a front left wheel 105, a front right wheel 110, a left rear wheel 115, and a right rear wheel 120, a front left wheel speed sensor 125, a front right wheel speed sensor 130, a left rear wheel speed sensor 135, and a right rear wheel speed sensor 140, a radar 145, a controller 150, and a display 155. The wheel speed sensors 125-140 sense the speed of their respective wheels 105-120, and provide an indication of the speed to the controller 150. The sensors 125-140 can provide the speed indication to the controller 150 directly or can provide the indication via a communication bus.

In some embodiments, the radar 145 is a microwave radar sensor that uses a frequency-modulated, continuous wave ("FMCW") technique to sense objects. The target radar 145 emits an FMCW signal at approximately 76.5 GHz. The emitted wave is reflected off of an object, and is received by the radar 145, and is processed (e.g., using a Doppler effect) to determine a speed of the vehicle 100. The signal processing of the reflected wave is performed either within the radar 145, the controller 150, or a combination thereof.

Figure 2:
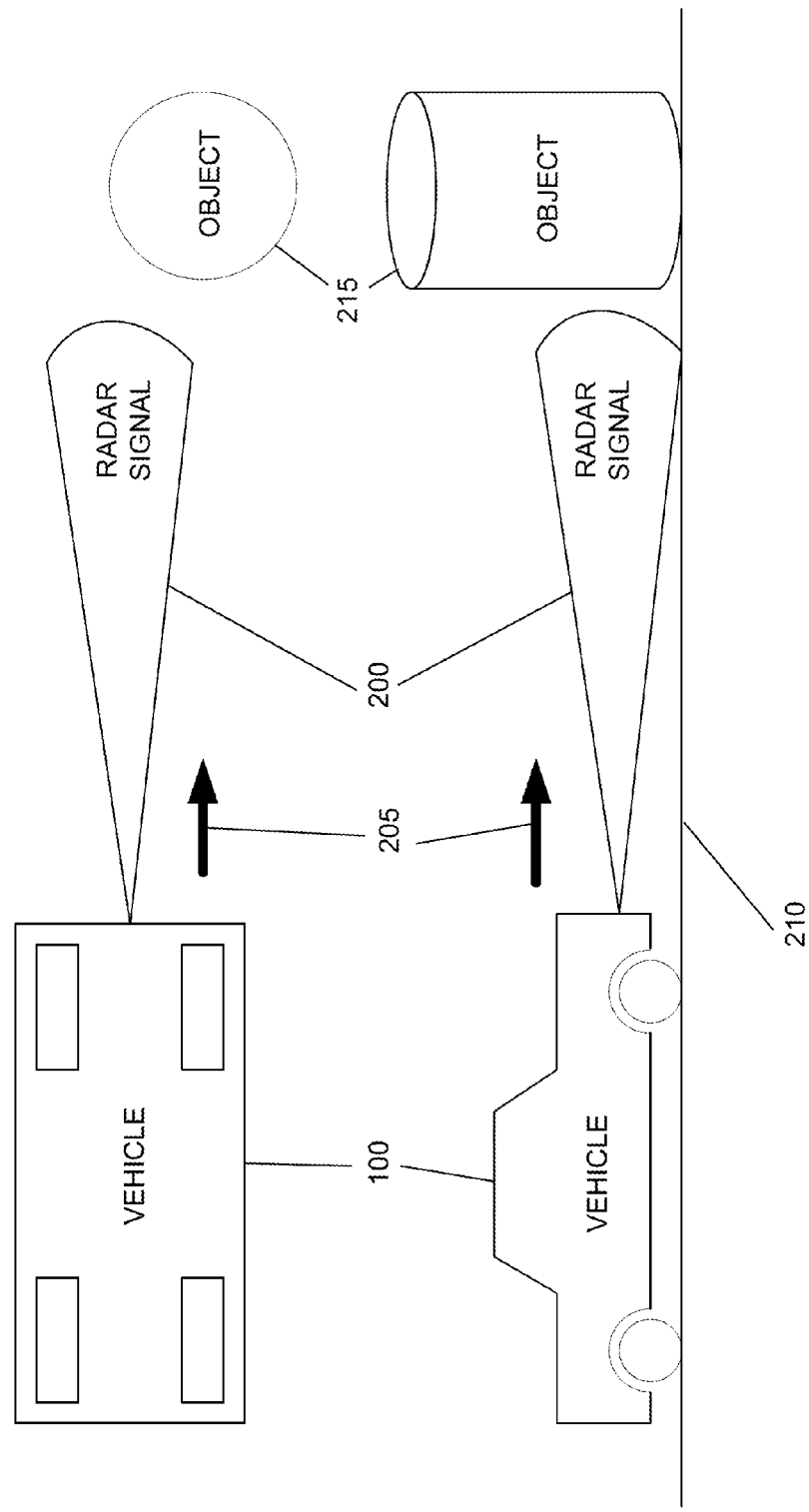
FIG. 2 is a block diagram showing a direction of a signal emitted by a radar of the vehicle.

As shown in FIG. 2, the radar 145 of the invention emits a signal 200 in a direction generally consistent with a path 205 of the vehicle 100, and parallel to a surface 210 the vehicle 100 is traveling on. The signal 200 is intended to reflect off of objects 215 that are positioned perpendicular to the vehicle 100. Objects 215 positioned perpendicular to the vehicle 100 generally provide a relatively large surface area off of which the signal 200 reflects. The relatively large surface area ensures that enough of the signal 200 is reflected, improving a signal-to-noise ratio in the signal received by the radar 145. A larger magnitude signal, improves the accuracy of the speed calculation, and reduces the amount of processing that must be done to determine the speed of the vehicle 100.

In other embodiments, the radar 145 uses a different sensing technology, such as radar (radiowave-based), lidar (light-based), sonar (sound-based), a scanning radar, etc., or a combination thereof. The invention also contemplates the use of a rear-facing radar or sensor (e.g., a radar used by a backup assist system) to determine the speed of the vehicle 100. The radar 145 outputs information to the controller 150 including a determined speed of the vehicle 100, positions of detected objects relative to the vehicle 100, etc.

The controller 150 includes a processor (e.g., a microprocessor, microcontroller, ASIC, DSP, etc.), memory (e.g., flash, ROM, RAM, EEPROM, etc.), which can be internal to the controller 150, external to the controller 150, or a combination thereof, and input/output circuitry. The display 155 can be an LCD display, one or more LEDs, etc., or a combination of display types.

Each wheel 105-120 includes a pneumatic tire. Should the air pressure in one or more of the pneumatic tires drop to a level below an acceptable minimum or go flat, action should be taken by the driver to prevent an unsafe operating condition.

Figure 3:
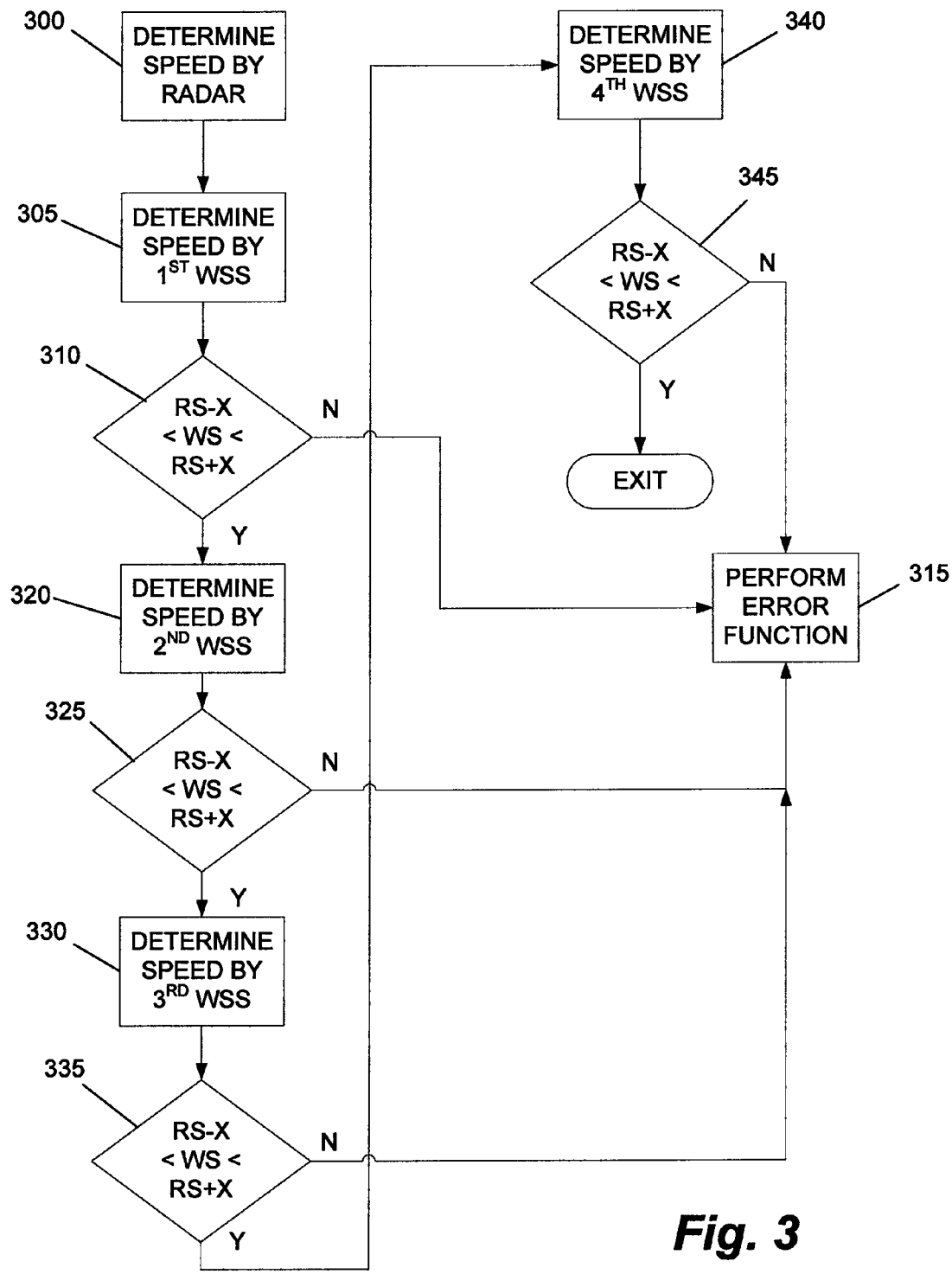
FIG. 3 is a flow chart of a process for determining if a tire is improperly inflated.

FIG. 3 shows a process for determining if one or more wheels 105-120 have lost tire pressure. The process can run continuously or can be time-based (e.g., run every 50 milliseconds). The process begins with the controller 150 determining the speed of the vehicle 100 based on the signal received from the radar 145 (step 300). Next the controller 150 determines the speed of the vehicle 100 based on the speed of the front left wheel 105 as determined by the wheel speed sensor 125 (step 305). The controller 150 then compares the speed as determined from the radar 145 to the speed determined from the wheel speed sensor 125 (step 310). If the speeds differ by more than a threshold or predetermined amount (e.g., five miles-per-hour "mph"), the controller 150 enters an error function or routine (step 315).

If the speeds fall within the threshold, the process repeats for the front right wheel 110 (steps 320-325), the rear left wheel 115 (steps 330-335), and the rear right wheel 120 (steps 340-345) as discussed next.

If the speeds were sufficiently close, the controller 150 determines the speed of the vehicle 100 based on the speed of the front right wheel 110 as determined by the wheel speed sensor 130 (step 320). The controller 150 determines the speed of the vehicle 100 based on the speed of the front right wheel 110 as determined by the wheel speed sensor 130 (step 320). The controller 150 then compares the speed as determined from the radar 145 to the speed determined from the next wheel speed sensor 130 (step 325). If the speeds differ by more than a threshold (e.g., five miles-per-hour "mph"), the controller 150 enters an error function (step 315).

If the speeds were sufficiently close, the controller 150 determines the speed of the vehicle 100 based on the speed of the rear left wheel 115 as determined by the wheel speed sensor 135 (step 330). The controller 150 then compares the speed as determined from the radar 145 to the speed determined from the next wheel speed sensor 135 (step 335). If the speeds differ by more than a threshold (e.g., five miles-per-hour "mph"), the controller 150 enters an error function (step 315).

If the speeds were sufficiently close, the controller 150 determines the speed of the vehicle 100 based on the speed of the rear right wheel 120 as determined by the wheel speed sensor 140 (step 340). The controller 150 then compares the speed as determined from the radar 145 to the speed determined from the next wheel speed sensor 140 (step 345). If the speeds differ by more than a threshold (e.g., five miles-per-hour "mph"), the controller 150 enters an error function (step 315).

In some embodiments, the error function (step 315) includes providing an indication to the driver that one or more tires are improperly inflated. The indication can be a lit symbol on a dashboard of the vehicle 100, a message on an LCD display, or other suitable way of indicating the condition. In some embodiments, the error function (step 315) includes taking action (e.g., performing a safety function such as slowing the vehicle 100 down) when the amount of under-/over-inflation exceeds a threshold deemed unsafe. In some embodiments, the action is performed by a vehicle controller (e.g., an electronic stability control system).

Additional functions performed in some embodiments include, not performing the process of FIG. 3 when the speed of the vehicle 100 is less than a threshold (e.g., five miles-per-hour), filtering the signals from the wheel speed sensors 125-140 to reduce erroneous readings, determining that a deflation event has occurred when the controller 150 detects one or more wheels 105-120 rapidly accelerating when readings from the radar 145 do not indicate such acceleration, and determining that a deflation event has occurred when one wheel 105-120 accelerates at a rate significantly different that the other wheels 105-120. In addition, the controller 150 can check the inflation of all four tires, and is capable of determining that all four tires are under-inflated (e.g., all the tires have blown out). For example, the controller 150 can determine if all four wheels are rotating at the same speed first, and then compare the determined speed of the wheels to the speed determined by the radar. If the speeds are sufficiently different, the controller 150 determines that all four wheels are improperly-inflated (e.g., blown out).

In order for the controller 150 to accurately determine the speed of the vehicle 100 using the speed of the wheels 105-120, the controller 150 is programmed with the circumference of the tires of the wheels 105-120. Should a user change the tires or wheels of the vehicle 100, the controller 150 needs to be calibrated to the new circumference. In some embodiments, the calibration is performed by the user providing the new circumference to the controller 150 (e.g., entering the circumference into an interface). In other embodiments, a calibration function is performed where the user puts the vehicle 100 into a calibration mode, and drives the vehicle 100. In calibration mode, the controller 150 calibrates the speed of the wheels 105-120 to match the speed determined by the radar 145.

Various features and advantages of the invention are set forth in the following claims.

What is claimed is:

1. A system for determining if a tire of a vehicle is improperly inflated, the system comprising:
  a radar configured to emit a signal generally parallel to a surface the vehicle is traveling on, to detect a reflection of the signal off of an object positioned perpendicular to the vehicle, and to output an indication of a speed of the vehicle;
  a wheel speed sensor configured to sense a speed of a wheel of the vehicle; and
  a controller coupled to the radar and the wheel speed sensor, the controller configured to receive the indication of the speed of the vehicle from the radar, to calculate a speed of the vehicle based on the sensed speed of the wheel, and to determine that a tire of the wheel is improperly inflated when the speed of the vehicle calculated using the wheel speed sensor varies by more than a predetermined amount from the speed of the vehicle determined by the radar, the controller slowing the vehicle when the tire of the wheel is determined to be improperly inflated.

2. The system of claim 1, further comprising a second wheel speed sensor configured to sense a speed of a second wheel of the vehicle, the controller configured to calculate a speed of the vehicle based on the sensed speed of the second wheel, and to determine a tire of the second wheel is improperly inflated when the speed of the vehicle calculated using the second wheel speed sensor varies by more than a predetermined amount from the speed of the vehicle determined by the radar.

3. The system of claim 1, wherein the controller executes an error routine when the tire is improperly inflated.

4. The system of claim 3, wherein the error routine includes providing an indication to a user that the tire is improperly inflated.

5. The system of claim 3, wherein the error routine causes the vehicle to perform a safety function.

6. The system of claim 1, wherein the controller is configured to perform a calibration function.

7. The system of claim 6, wherein the calibration function includes operating the vehicle and calibrating the speed of the vehicle calculated using the wheel speed sensor to the speed of the vehicle determined by the radar.

8. The system of claim 6, wherein the calibration function is performed by receiving an indication of size of the wheel and tire.

9. The system of claim 1, further comprising a second wheel speed sensor configured to sense a speed of a second wheel of the vehicle, a third wheel speed sensor configured to sense a speed of a third wheel of the vehicle, a fourth wheel speed sensor configured to sense a speed of a fourth wheel of the vehicle, the controller able to determine that the tire, a second tire on the second wheel, a third tire on the third wheel, and a fourth tire on the fourth wheel have all become underinflated at about the same time.

10. The system of claim 1, wherein the radar emits the signal in a direction forward of the vehicle.

11. The system of claim 1, wherein the radar emits the signal in a direction rearward of the vehicle.

12. A method of detecting an improperly inflated tire on a vehicle, the method comprising:
a controller entering a tire calibration mode based on an input from a driver;
a radar emitting a signal in a forward direction generally parallel to a surface the vehicle is traveling on;
the radar detecting a reflection of the signal off of an object positioned perpendicular to the vehicle;
determining a speed of the vehicle based on the signal;
detecting a speed of a wheel of the vehicle;
the controller determining a circumference of the tire based on the determined speed of the vehicle and the detected speed of the wheel;
the controller determining a calculated speed of the vehicle based on the detected speed of the wheel after exiting the calibration mode; and
the controller determining a tire of the wheel is improperly inflated when the calculated speed of the vehicle varies by more than a predetermined amount from the speed of the vehicle determined based on the signal.

13. The method of claim 12, further comprising detecting a speed of a second wheel of the vehicle, determining a second calculated speed of the vehicle based on the detected speed of the second wheel, and determining a tire of the second wheel is improperly inflated when the second calculated speed of the vehicle varies by more than a predetermined amount from the speed of the vehicle determined based on the signal.

14. The method of claim 12, further comprising executing an error routine when the tire is improperly inflated.

15. The method of claim 12, further comprising providing an indication to a user that the tire is improperly inflated.

16. The method of claim 12, further comprising performing a safety function when the tire is improperly inflated.

17. The method of claim 12, further comprising calibrating the calculated speed to the wheel and tire.

18. The method of claim 17, further operating the vehicle to calibrate the calculated speed of the vehicle to the speed of the vehicle determined by the emitted signal.

19. The method of claim 12, further comprising receiving an indication of size of the wheel and tire to calibrate the calculated speed.

* * * * *